Dec. 5, 1967   L. P. RAITIERE   3,356,002
WIDE ANGLE OPTICAL SYSTEM
Filed July 14, 1965   2 Sheets-Sheet 1

INVENTOR.
LOUIS P. RAITIERE
BY *H. S. Mackey*
ATTORNEY

Dec. 5, 1967   L. P. RAITIERE   3,356,002
WIDE ANGLE OPTICAL SYSTEM
Filed July 14, 1965   2 Sheets-Sheet 2

ASPHERIC $y^2 = 2R_0 x - (1+\epsilon)x^2 - 2ax^3$
$R_0 = +100.9608$
$\epsilon = +22.2250$
$a = -1.37523$

INVENTOR.
LOUIS P. RAITIERE
BY
ATTORNEY

United States Patent Office 3,356,002
Patented Dec. 5, 1967

3,356,002
WIDE ANGLE OPTICAL SYSTEM
Louis P. Raitiere, Far Rockaway, N.Y., assignor to General Precision, Inc., a corporation of Delaware
Filed July 14, 1965, Ser. No. 471,814
13 Claims. (Cl. 95—18)

ABSTRACT OF THE DISCLOSURE

A wide angle optical objective system is provided in which three optical objective lenses combine the entrance pupil forming lens elements into a common form element which segments a wide angle field into three matable segments which have adjacent edges on a common beam and forms three virtual entrance pupils, one for each lens, at a common point. Each lens has a separate image forming lens element each of which views one of the segmented fields respectively through a common point, as far as perspective is concerned. This provides three images which when put together form a wide angle picture, viewed from the same point of perspective without overlap or gap at the join edges of the images. The small angle of view of the segmented view provides good image resolution, not capable in wide angle image production.

---

The present invention relates to wide angle lens objective systems. In particular, the present invention relates to a multiple optical objective lens system for a plurality of cameras in which a wide angle view is segmented into a plurality of matable sections and each section is viewed from the same point as far as perspective is concerned.

From one aspect the present invention is a multiple optical objective lens system in which the front or pupil forming lens element of each of the objective lenses is combined into a composite lens element which segments a wide angle field of view into a plurality of matable sections and places the virtual entrance pupil of each optical objective lens at a common point, in free space.

From another aspect the present invention is a wide angle lens multi-camera optical objective system which segments a total wide angle view into a plurality of matable sections and provides a plurality of matable images viewed from the same point as far as perspective is concerned which may be combined to form a continuous wide angle image.

Each of the optical objective lenses includes an entrance pupil forming lens element which combines with what may be considered an image forming lens element. The entrance pupil forming elements of each lens are combined to form a composite front lens element which partitions or segments the wide angle field of view into a number of matable sections equal to the number of optical objective lenses in the system. In addition, the entrance pupil forming lens elements each place the virtual or apparent entrance pupil of its particular objective lens in exact coincidence with the virtual entrance pupil of all the other objective lenses in the multiple optical objective lens system. Optically the actual entrance pupil of each objective lens is transferred to the surface of the first glass component of an image forming lens element of the respective objective lens. This essentially makes the virtual entrance pupil a point of common perspective. Thus, each of the objective lenses views its particular segmented field of view through a point of common perspective.

The remaining lens component in each optical objective lens is here, for convenience, referred to as the image forming lens element. Each image forming lens element is positioned to cooperate with that section of the front element which forms the entrance pupil of that particular lens combination. Physically, each image forming lens element of the multiple optical objective lens system is remotely located from each other as well as its virtual entrance pupil. However, each image forming lens views and forms an image of the particular segment or section of the wide angle field with which it is associated, from a common point as far as perspective is concerned.

The arrangement provides a plurality of matable images which are viewed from the same point of perspective and will provide a continuous wide angle image from a plurality of cameras in uniform perspective.

The term "camera" as employed herein includes a television camera or vidicon and a camera that employs light sensitive paper for taking photographs or a photographic camera.

It is well known in the art that a television system has inherent resolution limitations. This is also true as regards to a camera and lens for taking photographs.

The illustrated form of the present invention provides an optical combination capable of imaging the entire scene visible within a solid angle of substantially 160° horizontally by 90° vertically. However, it will be seen that both extension and reduction of the scope of the system is possible and practical, and may be easily accomplished.

It will be seen that there is provided an optical objective lens system which produces two or more (in the illustrated form, three) meticulously joined images originating from a common view point as far as perspective is concerned. In the present system the join lines or seams between the individual images are eliminated so that the viewed image of one field merges smoothly into the image of the adjacent field. Geometric distortion has been eliminated and the scale factors of all the fields or views provided, are equal.

In a multi-camera system, employing vidicons, for providing a wide angle view, some inherent defects including "piecing adjacent images, geometric distortions and scale factors may be compensated for by introducing compensating adjustment in the television components of the system. However, the present multiple optical objective lens system is inherently self-correcting and such compensating adjustments are made unnecessary. In addition, the self-correcting characteristics of the multiple optical objective lens system makes possible the use of the system with photographic cameras as well as television cameras.

It will be seen that the axis of each lens of the multiple optical objective lens system intersects with each other axis at a common point which can be accepted as the view point of the system insofar as perspective is concerned. Such common point is the virtual or apparent entrance pupil for each of the objective lenses. The characteristics of the pupil forming lens element of each lens in the system is such so as to locate all the virtual entrance pupils of the multiple objective lens system in exact coincidence.

The front or pupil forming lens element of each optical lens of the multiple optical objective system is coupled to form a single integrated block which functions as a solid piece of glass and provides invisible joining of adjacent fields and locates the virtual entrance pupils at a common point, in exact coincidence.

By employing optical objective lenses of the telephoto-in-reverse type, the front or pupil forming lens element and the rear or image forming lens element are widely separated providing a convenient internal air space in which to locate the virtual entrance pupil of the lens.

For convenience of manufacture and clarity of description the front element is herein shown and described as a plurality of aspheric lenses and an inner lens having a spherical image side. The components are bonded together so that the composite element functions as a solid piece of glass. However, the front element could be made out of a solid piece of glass having the overall dimensions indicated.

The image forming element may take any of several forms, two of which are shown. The image forming lens element of an optical objective lens of this type need only compensate for any aberrations developed in the front lens element so that the image obtained on the focal plane of the lens is a true representation or image of the view.

It is thus an object of the present invention to provide a wide angle lens which segments a wide angle field into a plurality of matable segments and provides a plurality of matable images viewed from the same point as far as perspective is concerned.

Another object is to provide a multiple optical objective lens system in which the pupil forming lens elements of each optical objective lens are coupled to form a single integrated block which functions as a solid piece of glass and forms a common front element for the system.

Another object is to provide a multiple optical objective lens system having a plurality of pupil forming lens elements coupled to function as a solid piece of glass in which each pupil forming lens portion of the complex lens forms the virtual entrance pupil of optical lens, of which it is a part, at a point in free space so that all the virtual entrance pupils of the multiple objective lens system are in coincidence.

These and other related objects will become more apparent from reading the following detailed description with reference to the accompanying drawings in which.

Figure 1:
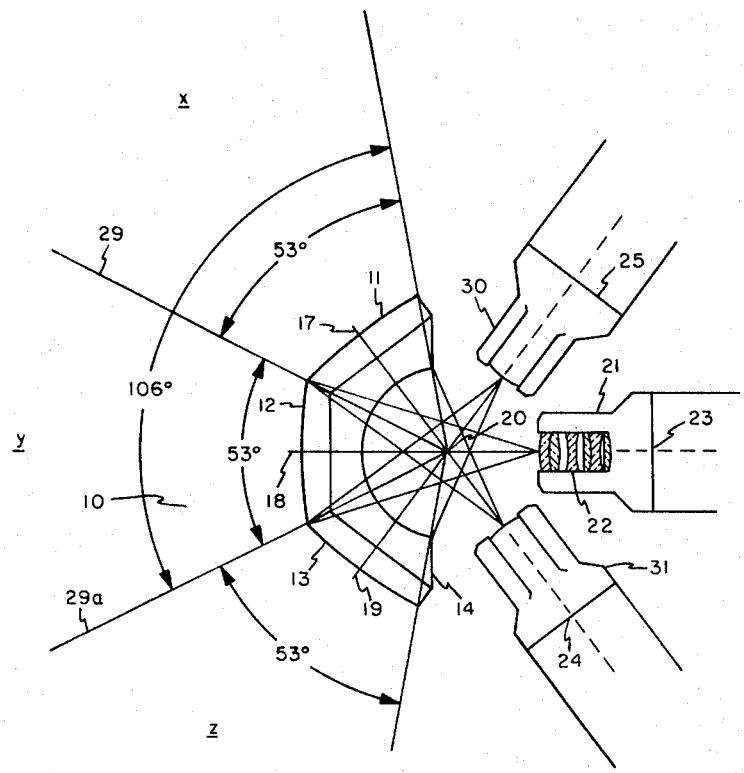
FIG. 1 is a graphic illustration of a multiple optical objective lens system without duplication of the image forming lens element of two of the optical lenses.

Referring to FIG. 1 one embodiment of the present invention is illustrated in which the multiple optical objective lens system includes three optical objective lenses.

The three pupil forming lens elements of each lens are combined in the complex front element 10.

The front element is described in more detail with reference to FIGS. 3, 4 and 5.

It will be seen that, in the presented embodiment, the front element segments a horizontal wide angle field of substantially 159° into three segments or sections of 53° each. If desired, one of the pupil forming lens element sections may be eliminated so that a horizontal wide angle field of 106° is obtained. Or, an additional pupil forming element section may be added so that a horizontal wide angle field of 212° may be obtained.

The front element 10 is a composite component which may be made from a plurality of aspheric lens components such as 11, 12 and 13 and an inner lens component such as 14. In its preferred construction the individual components are bonded together to function as a solid piece of glass, the aspheric lenses 11, 12 and 13 being substantially identical in aspheric structure. By removing one aspheric lens, such as 13 for example, and making the inner lens 14 shorter, a wide angle field of 106° may be covered by the front element in two segments of view. By adding another aspheric lens and extending the inner lens element so that the angle of the extended objective surface follows the pattern set forth and the spherical contour of the image surface is maintained, a horizontal wide angle field of some 212° may be obtained and sectioned into four segments of view.

It will be understood by those familiar with this art that the lines 17, 18 and 19 represent the axes of the pupil forming lens elements, as well as the axes of the respective optical objective lenses. The axes meet at a common point 20 which is the apparent entrance pupil of each lens. In addition, the point 20 is the common point through which each image forming lens "sees" or looks at its respective segmented view of the overall field. Thus the point 20 becomes the point of common perspective.

Although the point 20 is the apparent or virtual entrance pupil of each lens it will be seen that the refraction characteristics of the glass or complex lens 10 bend the path of the light rays (see lines 29 and 29a) so that the actual entrance pupil is transferred to the object surface of the image forming lens of each lens combination.

It will further be seen that the beam 29 (and 29a) is split and directed to adjacent lenses thus defining the extreme of the segmented fields $x$ and $y$. The beam 29 which is split by the front lens element is directed to the image forming lens in cylinder 21 and in cylinder 31. Thus adjacent images have edges, made by the same beam and are therefore matable.

Figure 6:
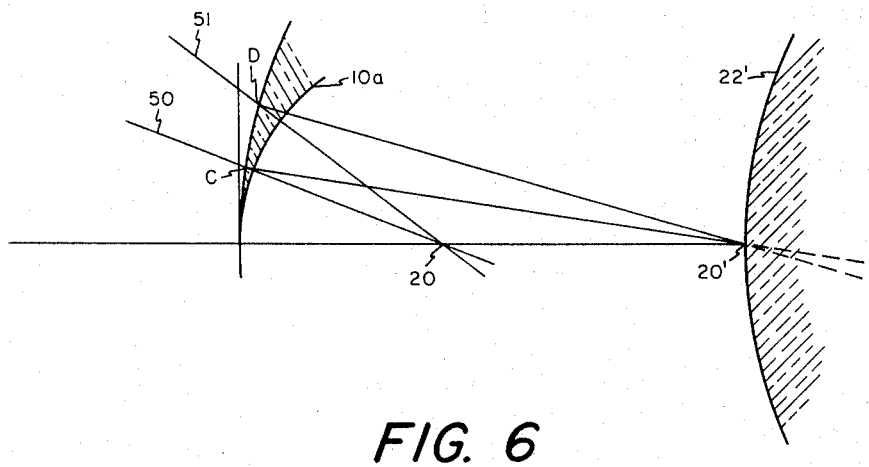
FIG. 6 is a drawing helpful in understanding the invention.

The refraction characteristics are more clearly represented in FIG. 6 where 10a represents a portion of the entrance pupil forming lens. The beam 50 strikes or enters the lens 10a at point C. The point 20 represents the apparent or virtual entrance pupil, however, the actual entrance pupil is transferred to point 20', the point 20' being on the outer surface of the glass 22' which represents part of the image forming lens.

The beam 51 enters the glass 10a at point D and is refracted to the point 20' on the surface of the glass 22'. The apparent entrance pupil for the beam 51 is also at point 20.

Thus the virtual entrance pupil for each of the objective lenses is at point 20 while the actual entrance pupil for each lens is transferred to, or, positioned on the object surface of the image forming lens element of each objective lens.

Only one complete image forming lens is illustrated, as it will be understood that other image forming lens elements of substantially the same construction are mounted in the cylinders above (30) and below (31) the mounting cylinder 21.

It will be understood that one complete optical objective lens includes, for example, such lens components as the aspheric section 12, that section of the inner lens, directly behind the aspheric lens 12 (having an axis 18) and the lens assembly 22 in the mounting cylinder 21.

The assembly of lens elements 22 forms what has been referred to as the image forming lens element, the image focal plane being represented as 23.

It will be seen that an image of the 53° field $y$ will fall on the image plane 23. The image of the 53° field $x$ will fall on the image plane 24 and the image of the 53° field $z$ will fall on the image plane 25.

The dimensions and structure of the front element are such that the adjacent extremes or edges of, for example, the field segments $x$ and $y$ (along line 29) are in coincidence, without overlap and without gap. In addition, the fields $x$ and $y$, as well as $z$, are viewed through virtual entrance pupils which are in exact coincidence. This essentially provides three images (at 23, 24 and 25 of fields $y$, $x$ and $z$ respectively) which have adjacent sides in coincidence and each of the images are representative of their respective views seen from the same point as far as perspective is concerned.

It will be understood that the graphic illustration presented in FIG. 1 does not attempt to present absolute accuracy in lines and angles of light ray refractions as functions of the lens components.

It will be also understood that the mounting cylinders 21, 30 and 31 may support part of the optical objective lens of photographic cameras and that photosensitive film or paper may be positioned on the focal planes 23, 24 and 25 and a picture image of each segment $y$, $x$ and $z$ may be obtained. The picture images may be mated together and will provide a wide angle image or picture of substantially 159° in the horizontal direction, the entire or complete picture being free from overlap or gap and without visible seams, the complete picture having uniform scale and identical perspective.

It may be desired to obtain an image of the wide angle field by use of a television camera or vidicon. Should this be the case the bulk of the vidicon may prohibit inclusion of three such cameras in the space available at the focal planes 23, 24 and 25.

Figure 2:
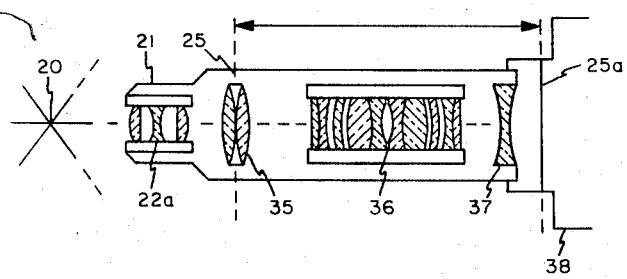
FIG. 2 is a graphic illustration of an alternate image forming lens element including a relay lens element for transferring the image focal plane.

To acquire additional space a relay lens may be employed with each objective lens, such as that illustrated in FIG. 2. In addition to the relay lens elements shown in FIG. 2 another form of image forming lens element, 22a, is illustrated.

Referring back to FIG. 1, the function of the image forming lens elements 22 is to correct the aberration and astigmatism in that part of the front or pupil forming lens associated with the image forming lens. In general, the image forming lens 22 in FIG. 1 is represented as a basic triplet type lens with the first element a cemented doublet and a weak negative cemented doublet introduced in the combination.

This combination has a resulting equivalent focal length of 7.02 mm. and an aperture of $f/4.8$. This is one example of an image forming lens element that may be employed in combination with an entrance pupil forming lens element for providing an optical objective lens.

An alternate image forming lens is presented in FIG. 2 as a simple triplet of the classical Cooke type (22a) with a field flattener 37, added to achieve full correction. A field lens 35 is centered on the focal plane 25 and a relay lens 36 which may be described generally as Gauss lenses back-to-back, which provides a one-to-one magnification, serves to transfer the focal plane 25 to a more remote location 25a.

By transferring the image focal plane to a position at 25a sufficient space is made available for bulk of a television camera of moderately small size.

A miniature television camera may not require this arrangement and thus the transferring of the focal plane from, for example, position 25 in FIG. 2 (and FIG. 1) to position 25a in FIG. 2 may not be required.

Figures 3, 4:
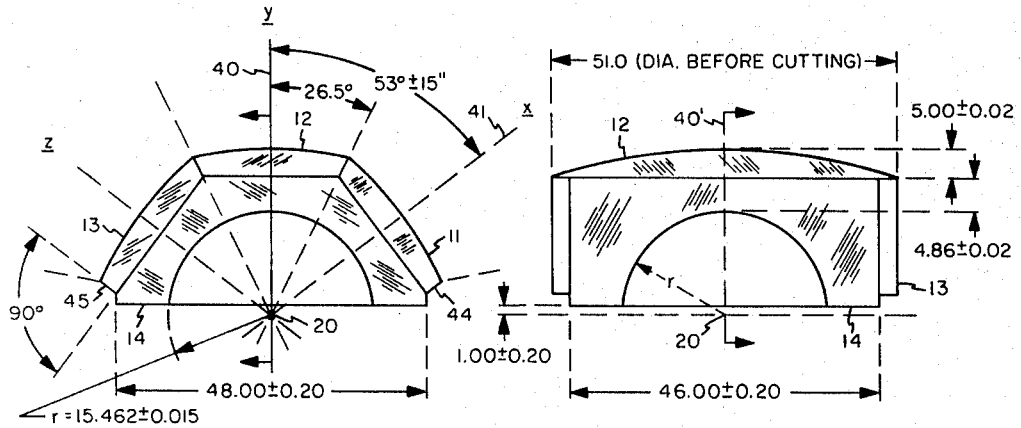
FIG. 3 is a top cross-sectional view of front or pupil forming lens element.
FIG. 4 is a side cross-sectional view of the front or pupil forming lens element.
Figure 5:
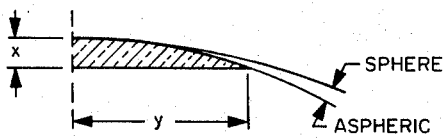
FIG. 5 is a view of part of the aspheric component of the front lens element helpful in understanding the invention.

FIGS. 3, 4 and 5 describe, more fully, the structure of the front or pupil forming lens element. FIG. 3 is a cross-sectional view, from the top of the lens element through line 40' of FIG. 4 illustrating an embodiment having a wide angle horizontal field of substantially 159°. FIG. 4 shows a cross-sectional view, from the side, through line 40 of FIG. 3, of the lens element with the embodiment having a wide angle vertical field of substantially 90°. FIGS. 3 and 4 include the measurements and dimensions of the lens while FIG. 5 shows part of one of the aspheric lens components (all the aspheric lens components being substantially identical) with the formula for the aspheric dimensions.

Referring particularly to FIG. 3 it will be seen that the inner lens 14 has a spherical contour on its image surface with a radius of 15.462±0.015 mm. It will further be noted that the center of the sphere is the point 20 which is the center of the virtual entrance pupils of the individual optical objective lenses. The objective surface of the inner lens 14 is a plurality of flat surface angularly displaced so that a perpendicular passing through the surface, such as 40, and a perpendicular such as 41 passing through the adjacent surface intersect at the point 20 and form an angle of 53° ± 15″.

It will be further seen that the overall length of the inner lens component is 48.00±0.20 mm.

The aspheric lens components each have an image surface which mates with one angular surface of the inner lens component. The ends of the lens component 12 are cut so as to define the field of view of the field segment $y$ with the ends of lens components 11 and 13 cut to mate with the adjacent ends of lens 12. The end surfaces 44 and 45 of the lens components 11 and 13 each form an angle of 90° with the image surface of their respective lenses. The end surface 44 of lens component 11 and the end surface of lens 11 mated with the end surface of lens component 12 define the field of view $x$. Correspondingly the end surface 45 of lens component 13 and the end surface of lens 11 mated with the end surface of lens component 12 define the field of view $z$.

FIG. 4 indicates that the maximum thickness of each aspheric lens component is 5.00±0.02 mm. While the minimum thickness of the inner spherical lens component is 4.86±0.02 mm. In the embodiment having a field of view of 159° of horizontal angle and 90° of vertical angle, such as illustrated, the inner lens is 1.00±0.20 mm. less than a hemsphere on its image surface.

FIG. 5 illustrates part of one of the aspheric lens components (11, 12 or 13) before cutting. The formula for defining the aspheric dimensions of the lens may be stated as:

$$\text{aspheric } y^2 = 2R_0 x - (1+\epsilon)x^2 - 2\alpha x^3 \qquad (1)$$

where $x$ represents the deviation from a flat plane, $y$ is the distance from the optical axis, $R_0$ equals $+100.9608$, $\epsilon$ equals $+22.2250$ and $\alpha$ equals $-1.37523$, such values being in millimeters. The quantity $R_0$ is the radius of curvature of the sphere, $\epsilon$ is the deviation from spherosity at one area and $\alpha$ is the deviation from spherosity at another area. Such symbols are familiar to those in the art and are readily understood.

It will be appreciated that the front or pupil forming lens element is described as a composite lens having a plurality of components. The components are bonded together by a bonding material having the same or almost the same refraction characteristics as the glass. Satisfactory results have been obtained by using an artificial resin, Geon 222, made by The B. F. Goodrich Chemical Company, and a liquid solvent 1-bromonaphthalene of high index. By using a suitable mixture the bonding material was made to match the index of the glass. The glass employed was Schott PSK–1 of melt 210297

$$(N_d = 1.54839)$$

having surface quality better than 2 fringes.

From an economical standpoint it is practical to make the front element in composite form. However, it is possible to make the front element out of a solid piece of glass having the external structure shown.

Thus I have described my invention which a wide angle multiple optical objective lens system including the combining of a plurality of pupil forming lens elements into a composite front element and a corresponding number of image forming lens elements which segment a wide angle field into a plurality of smaller matable fields of view having a common perspective.

I have shown a multiple optical objective lens system in which three optical objective lenses are included in the system. I have described how the invention may be both extended and reduced in field of horizontal view. I have shown and described two forms of image forming lens elements and provision for transferring the focal plane. Other forms of my invention, as will be familiar to those skilled in the art, may be made by substitution or alteration of components without departing from the spirit of the invenion as defined by the appended claims.

What is claimed is:

1. A wide angle optical objective system for use with a plurality of cameras for segmenting a continuous wide angle field of view into a plurality of uniform matable segments and providing a plurality of uniform matable images which may be combined to provide a continuous image of the total wide angle field of view, said objective system including, for each of said cameras,
an image forming lens element for projecting an image of a field of view upon a focal plane, said field being viewed through a virtual entrance pupil,
a pupl forming lens element for forming said virtual entrance pupil in free space positioned between said image forming lens element and said pupil forming lens element,
said pupil forming lens element having refraction characteristics which are such as to transfer the actual entrance pupil to the object surface of the image forming lens element, and
each of said pupil forming lens elements defining a field of view having the side adjacent to the adjacent field in coincidence.

2. A wide angle optical objective system as in claim 1 and in which,
each field of view is an unduplicated segment of a larger field of view having adjacent edges of the field defined by the same principal light ray, and
the virtual entrance pupil formed by each pupil forming lens element is positioned in coincidence with the virtual entrance pupil formed by each other pupil forming lens element of the system.

3. A wide angle optical objective system as in claim 2 and in which each camera of said plurality of cameras is a photographic camera and includes,
photosensitive means positioned on said focal plane for preserving the image of the field of view for providing a plurality of segmented images of a larger field of view viewed from the same point as far as perspective is concerned.

4. A wide angle optical objective system as in claim 1 and in which each camera of said plurality of cameras is a television camera and the lens system of each said camera further includes.
a field lens element positioned on the said focal plane,
a relay lens element and,
a field flattener lens element, said field lens element, relay lens element and said field flattener lens element cooperatively coacting to transfer said focal plane to a position further along the axis of the individual objective lens for providing space for positioning a television camera for receiving an image of the field of view of the pupil forming lens element at transferred focal plane.

5. A wide angle optical objective system as in claim 1 and in which,
each of said pupil forming lens elements of said system are bonded together and function as a solid piece of glass for providing a wide angle lens having a continuous field of view of at least 106° horizontally and at least 90° vertically and said horizontal field of view is segmented into at least two fields of view having adjacent edges of said field in coincidence for forming a plurality of matable images of said total field.

6. A wide angle optical objective system for segmenting a continuous wide angle field of view into a plurality of uniform matable smaller fields of view for providing a plurality of uniform matable images of the segmented wide angle field including,
a front lens element having a continuous wide angle field of view said front lens element being a composite of,
a plurality of aspheric lenses bonded together at adjacent ends, and positioned so that a line through said adjacent ends extending from a common point define the segments of said continuous wide angle field and,
an inner lens having a continuous spherical inner surface, the center of which is said common point, and an outer surface angularly planed for receiving the aspheric lenses, said aspheric lenses being bonded to the outer surface of said inner lens so that the aspheric surface of each of said plurality of aspheric lenses form the object surface of said front lens element,
each said aspheric lens and the part of the inner lens to which it is bonded forming a virtual entrance pupil in coincidence with said common point,
a plurality of image forming lens elements equal in number to the number of aspheric lenses in said plurality of aspheric lenses, each image forming lens positioned for imaging one each of the uniform matable smaller fields of view through said common point.

7. A wide angle optical objective system as in claim 6 and in which,
each said aspheric lens and the part of the inner lens to which it is bonded forms an actual entrance pupil positioned on the object surface of the image forming lens element so imaging the segmented field of view.

8. A wide angle optical objective system as in claim 7 and in which,
each of said images of the respective uniform matable smaller fields of view are the same size and may be mated for providing a continuous image of said continuous wide angle field of view.

9. A wide angle optical objective system as in claim 6 and in which,
the said aspheric lenses are bonded together, and bonded to the said inner lens by adhesive means having a refraction index equal to the refraction index of the glass of the said lenses.

10. A wide angle optical objective system for segmenting a continuous wide angle field of view into a plurality of uniform matable segments for providing a plurality of uniform matable images which may be combined to provide a continuous image of the total wide angle field of view including,
a front lens element for segmenting the wide angle field of view into a plurality of uniform segments having adjacent edges on a common line of sight, said front lens element including,
a plurality of aspheric lens components covering consecutive fields of view of substantially 53° horizontally and substantially 90° vertically, in which said horizontal fields of view combine to form said continuous wide angle field of view,
an inner lens component having a plurality of planed surfaces angularly disposed from each other for receiving the image surface of each aspheric lens and having a spherical image surface the center of said sphere being the apex of the angle of the individual horizontal fields of view, the radius of said sphere being substantially 15.462 mm. and said wide angle optical objective system further including,
a plurality of image forming lens elements equal in number to the number of aspheric lens components in said plurality of aspheric lens components for imaging one each of the sair consecutive fields of view and positioned on the axis of the aspheric lens providing the field of view so viewed, and
each of said field of view being seen by said image forming lens element through the said center of said sphere so that each said fields of view is seen from the same point as far as perspective is concerned.

11. A multiple optical objective lens system for segmenting a continuous wide angle field of view into a plurality of matable smaller fields of view and having a common front lens element and individual image forming lens elements said common front lens element including,
a plurality of aspheric lens components each having an aspheric surface defined as, $$y^2 = 2R_0 x - (1+\epsilon)x^2 - 2\alpha x^3$$

where $x$ is the deviation from a flat plane, $y$ is the distance from the optical axis, $R_0$ is the radius of the sphere, $\epsilon$ is one deviation for spherosity and $\alpha$ is another deviation from spherosity and, an inner lens component having angularly displaced planed objective surfaces for receiving the image surface of each aspheric lens component and a spherical image surface, the center of the sphere being a point through which the axis of each aspheric lens passes, said common front lens element for segmenting said continuous wide angle field into a plurality of matable smaller fields of view and for forming the virtual entrance pupil of each objective lens at the said center of said sphere of said inner lens and for transferring the actual entrance pupil of each objective lens on the object surface of the respective image forming lens element associated with the particular aspheric lens.

12. A multiple optical objective lens system as in claim 11 and in which
$R_0$ is $+100.9608$,
$\epsilon$ is $+22.2250$, and
$\alpha$ is $-1.37523$.

13. A multiple optical objective lens system for segmenting a wide angle field of view into a plurality of matable smaller fields of view, each objective lens having an entarnce pupil forming lens element and an image forming lens element, said entrance pupil forming lens elements being combined into a common front lens element and comprising, a plurality of aspheric lens components each having an aspheric surface defined as $$y^2 = 2R_0 x - (1+\epsilon)x^2 - 2\alpha x^3$$

where $y$ is the distance from the optical axis, $x$ is the deviation from a flat plane, $R_0$ is the radius of the sphere and equals $+100.9608$, $\epsilon$ is the deviation from a sphere at one area and equals $+22.2250$ and $\alpha$ is the deviation from a sphere at another area and equals $-1.37523$, an inner lens component having a plurality of surfaces for receiving the aspheric lenses and having an image surface spherical in contour, the radius of which is substantially 15.462 and having a length of 48.00±0.20 and a width of 46.00±0.20 and a thickness of 4.86±0.02 on a line forming the axis of any aspheric lens of said plurality, said spherical surface being 1.00±0.20 less than a hemisphere, and means for bonding said aspheric lenses to said inner lens for providing said common front element of a solid piece of glass, said front lens element forming a virtual entrance pupil for each optical objective lens in coincidence with the center of the spherical contour of said inner lens and an actual entrance pupil for each optical objective lens on the object surface of the image forming lens element of the respective objective lens.

References Cited

UNITED STATES PATENTS

| | | | |
|---|---|---|---|
| 1,708,746 | 4/1929 | Hofe | 350—32 |
| 2,966,095 | 12/1960 | Woller | 352—70 |

JOHN M. HORAN, *Primary Examiner.*